United States Patent [19]

Jensen et al.

[11] Patent Number: 5,714,816
[45] Date of Patent: Feb. 3, 1998

[54] ELECTRIC MOTOR

[75] Inventors: Niels Due Jensen, Bjerringbro; Carl-Christian Danielsen, Ryomgård; Jørgen Kimer, Skanderborg, all of Denmark

[73] Assignee: Grundfos a/s, Denmark

[21] Appl. No.: 620,272

[22] Filed: Mar. 22, 1996

[30] Foreign Application Priority Data

Mar. 25, 1995 [DE] Germany ............ 195 11 114.1

[51] Int. Cl.$^6$ .............. H02K 5/18; H02K 5/20; H02K 11/00
[52] U.S. Cl. .............. 310/89; 310/64; 310/68 R
[58] Field of Search .............. 310/58, 59, 62, 310/63, 64, 68 R, 89

[56] References Cited

U.S. PATENT DOCUMENTS

| 3,748,509 | 7/1973 | Karcher | 310/68 D |
|---|---|---|---|
| 3,809,935 | 5/1974 | Kristen et al. | 310/68 R |
| 4,668,898 | 5/1987 | Harms et al. | 318/254 |
| 4,712,030 | 12/1987 | Lakin et al. | 310/89 |
| 4,831,294 | 5/1989 | Jussila | 310/89 |
| 4,840,222 | 6/1989 | Lakin et al. | 310/64 |
| 4,963,778 | 10/1990 | Jensen et al. | 310/89 |
| 4,988,905 | 1/1991 | Tolmie, Jr. | 310/89 |
| 5,006,744 | 4/1991 | Archer et al. | 310/89 |
| 5,038,088 | 8/1991 | Arends et al. | 310/62 |
| 5,430,931 | 7/1995 | Fisher et al. | 310/89 |

FOREIGN PATENT DOCUMENTS

| 0531200 | 3/1993 | European Pat. Off. . |
|---|---|---|
| 0619432 | 10/1994 | European Pat. Off. . |
| 3642724 | 6/1988 | Germany . |
| 4243044 | 7/1993 | Germany . |
| 9305174 | 12/1993 | Germany . |

*Primary Examiner*—Clayton E. LaBalle
*Attorney, Agent, or Firm*—Jacox, Meckstroth & Jenkins

[57] ABSTRACT

The invention relates to a frequency converter supplied electric motor comprising a cooling air blower, the cooling air of which for cooling the motor is guided along cooling ribs which are arranged on the motor housing. The frequency converter is arranged in a housing which is detachably connected to the motor housing and which comprises a first heat conducting housing part and at least a further housing part. The first housing part of the frequency converter housing forms the fan cowl and comprises a transverse wall which is provided and formed for the heat conducting connection to the heat producing components of the power circuit of the frequency converter. The first housing part is formed ribbed and openings in the hosing wall are provided in the footwell of the cooling ribs as air inlet openings for the cooling air stream. Moreover there is provided a further housing part which connects to the first housing part and has a purely accomodating function.

9 Claims, 4 Drawing Sheets

ELECTRIC MOTOR

BACKGROUND OF THE INVENTION

The invention relates to a frequency converter supplied electric motor having those features specified in the preamble of claim 1.

DESCRIPTION OF THE PRIOR ART

Frequency converter supplied electric motors of the above described type are increasingly used today for driving flow operated machines, such as for example rotary pumps and blowers. Precisely with these machines it is possible, by varying the rotational speed, particularly by increasing the rotational speed, made possible using the frequency converter supply, to extend the power range with good efficiencies, since their efficiency increases with the third power of the rotational speed. On the other hand with the variation in rotational speed made possible with frequency converter, supply advantages may also be achieved on part loading, since with appropriate control, the rotational speed corresponding to the required power can be set, so that the unit works with an adjusted energy consumption.

For driving such units, so called standard motors are known which are offered by renowned manufacturers. These concern a range of motor products which, with regard to their power, are graded so that a suitable drive motor can be found for each application.

In particular, with motors having a high power, the frequency converter also requires a considerable space requirement. On the one hand, the capacitors of the power circuit require more space with increasing motor power and on the other hand the dissipation of the heat losses becomes more of a problem with increased motor power.

It is known to laterally flange mount the frequency converter onto the motor housing similarly to a terminal box and to cool using convectional cooling but also with the cooling air stream of the motor. However with motors having a high power, this is also critical since on the one hand the cooling of the frequency converter is problematic and on the other hand the spacial dimensions of the frequency converter limits the application of the electric motor.

SUMMARY OF THE INVENTION

Proceeding from this it is the object of the invention to design a frequency converter supplied electric motor such that the above mentioned disadvantages are overcome, in particular providing for a compact design allowing the heat losses from the heat converter to be easily dissipated and providing for an inexpensive manufacture.

According to the invention this object is achieved by those features specified in the characterizing part of claim 1.

The solution according to the invention provides for the arrangement of the frequency converter in alignement with the rest of the motor housing and for the cooling air stream of the motor to be selectively used for cooling the frequency converter. Also the frequency converter housing is designed such that part of the housing at the same time forms part of the fan cowl of the motor. In this manner one and the same motor housing can be selectively made available with the frequency converter but also with the conventional fan cowl only, i.e. without the frequency converter having no design changes. The integration of the motor fan in the frequency converter housing also has the advantage that by appropriately guiding the flow within the frequency converter housing, a selective heat dissipation using the total cooling air stream of the motor is effected. Moreover a very compact construction can be realized, since the otherwise unused space in the region of the fan cowl may be used for components or cooling parts. Such a designed frequency converter supplied electric motor is compact and has a slim construction so that in the majority of applications the enlargement of the construction due to the frequency converter does not give rise to any problems. According to the invention the first housing part of the frequency converter housing is provided with a transverse wall and this transverse wall is provided and designed as a heat conducting connection to the heat generating components. Therefore the heat exchange is effected at this end face via an appropriate heat spreader, irrespective of the constructional size of the frequency converter so that a good heat dissipation is achieved. Importantly, this first part is the housing part, in which the cooling air stream is forcibly guided, i.e. cooling air is intensively flown through it. The remaining housing parts of the frequency converter will then not need have a particular design with regard to the heat dissipation. In order to further improve the heat dissipation of this first housing part, inside as well as outside, a multitude of cooling ribs are provided, whereby in the footwell of the outer cooling ribs there are provided openings through which the cooling air stream passes to the fan wheel. In this manner the cooling of the frequency converter for a comparatively small constructional size is further increased. A further housing part is then connected to the first housing part, this further part only serving a housing function and can therefore be designed quite freely.

It is preferable to construct the frequency converter housing in a modular manner so that for a range of motor constructions having the same outer cross section, the first heat conducting housing part of the frequency converter always remains unchanged and only the further housing part formed by a tubular hollow profile is varied. This variation is effected in the length only, i.e. the adaption of the frequency converter housing to the respective motor size is effected by adding this tubular hollow profile in an appropriate length. The lid which closes this hollow profile on its end side may also remain the same with all the embodiments.

It is particularly useful for motors of a small constructional size that the first and further housing parts of the frequency converter are formed from one piece, for example a moulded part.

The frequency converter housing may be protected from water spray without any problems and may be hermetically sealed, for example by providing appropriate sealing means between the first housing part and the profiled housing part as well as between the profiled housing part and the lid. It is clear that the cable entry and exit in the frequency converter housing are also appropriately protected.

For manufacturing technology it is particularly useful to form the first housing part from a metallic cast part which conducts heat well and to form the further housing part as a section of tubing of a corresponding metal profiled tube.

The electrical lead connection between the terminal box provided on the motor housing and the frequency converter is advantageously effected by a tube arranged on the outer side of the motor housing and which on the one hand runs into the terminal box and on the other hand runs into the frequency converter housing. The electrical leads located in the tube are protected there and are easily accessible. This design also permits the connection of the same motor directly via the terminal box to the mains supply as well as via the terminal box on the frequency converter and from then to the mains supply, according to the motor equipment.

Should the electric motor comprise a rough rectangular cross section, as is the case with modern motors of this type, this tube is then arranged in the corner region since this space in any case cannot be used for the actual motor and the fan blade does not brush over in this region.

The end side lid of the frequency converter housing serves merely to cover the housing part formed from a section of tubing and therefore has no important function. The lid can therefore advantageously be formed from a low cost plastic injection moulded part and can be attached to the end side irrespective of the length of the frequency converter housing.

It is preferable that the first housing part of the frequency converter is adapted in the region of its transverse wall to the topography of the power electronics on the one hand and to the outer contour of the fan wheel on the other hand, which allows for a directed dissipation of heat as well as a compact construction.

The frequency converter housing is thus arranged flush with the motor housing and runs into the cross-sectional outer contour of the housing, so that any constructional size across the axis of the motor is not influenced by the frequency converter. It is exactly this constructional size which is important in the majority of application cases.

BRIEF DESCRIPTION OF THE DRAWINGS

The invention is hereinafter described in more detail by way of one embodiment shown in the drawings. These show.

DETAILED DESCRIPTION OF THE PREFERRED EMBODIMENT

Figure 1:
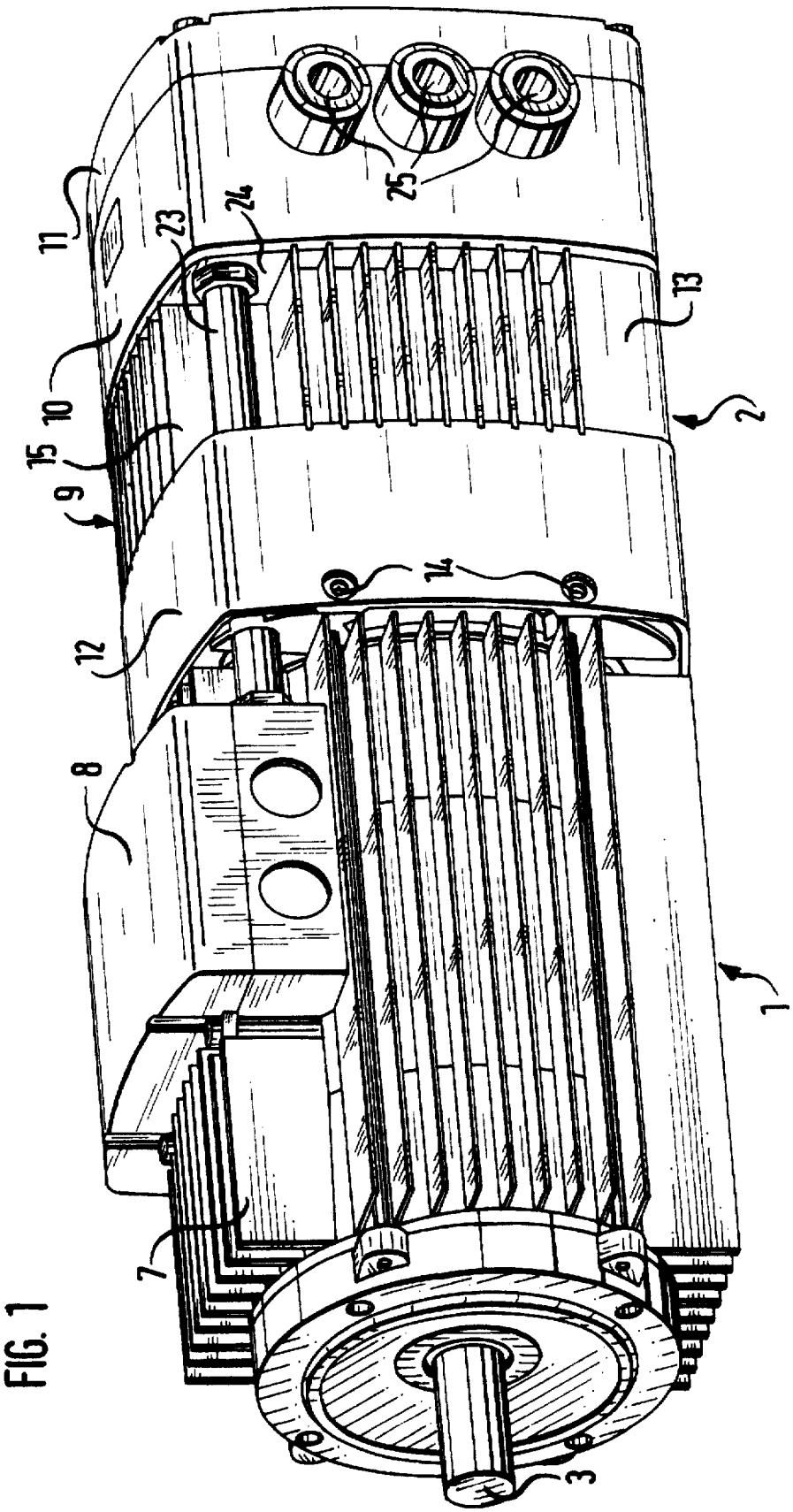
FIG. 1 one view of the electric motor according to the invention in schematic perspective representation, FIG. 2 an enlarged representation of the first housing part of the frequency converter shown according to FIG. 1, FIG. 3 the first housing part as shown according to FIG. 2 but from the other side and FIG. 4 a longitudinal section through the motor and frequency converter.
Figure 4:
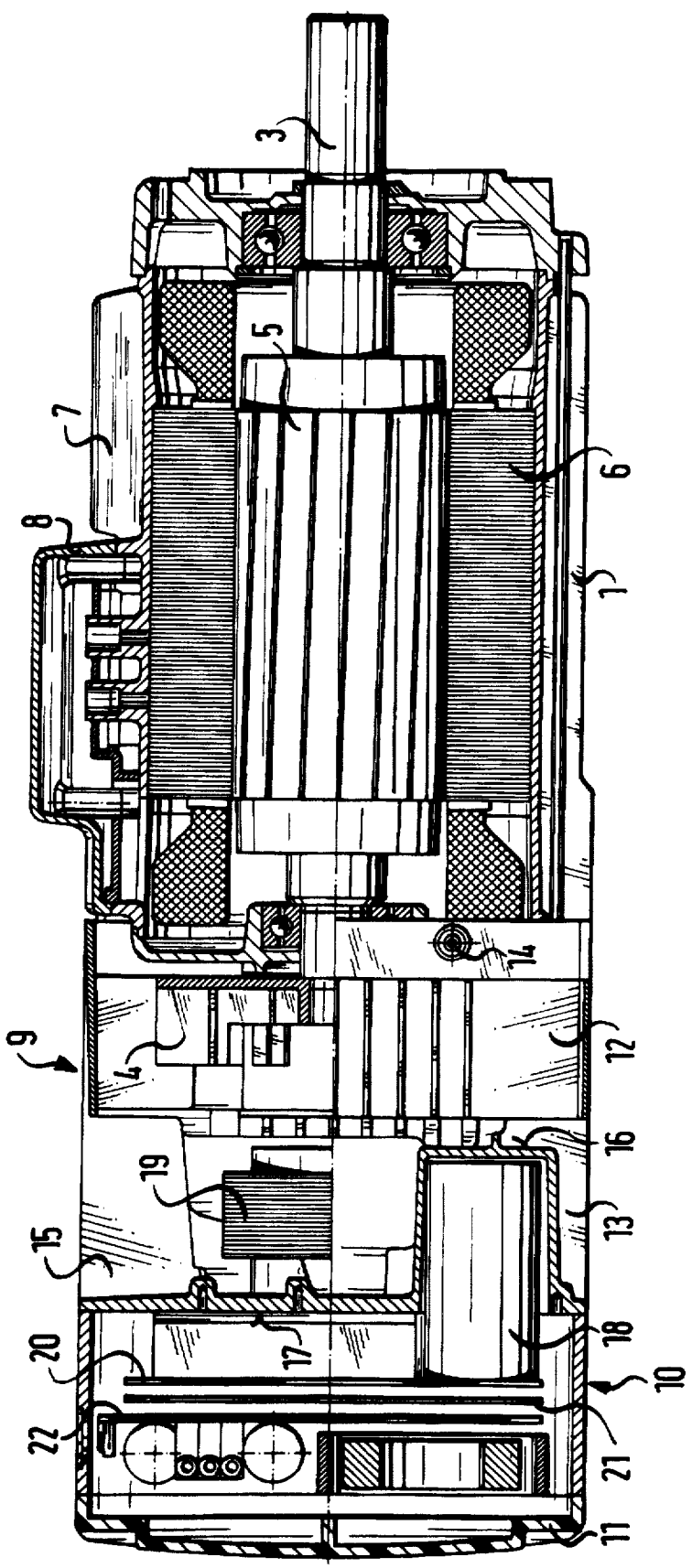

The electric motor shown in its entirity by way of FIGS. 1 and 4 comprises a motor housing 1 and flushly arranged to this in the direction of the axis of the motor is a frequency converter housing 2. At one end face of the motor housing 1 the drive shaft 3 of the motor is exposed, and at the other end face this shaft 3 carries the fan wheel 4. The shaft 3 is housed at both ends of the motor housing 1 in the usual manner and carries a rotor 3 which rotates within a stator 6.

The metallic motor housing 1 is provided with cooling ribs 7 on its outer side, running in the direction of the motor axis in such a manner that this results in an outer contour having an approximate rectangular but rounded cross section. A terminal box 8, protruding upwardly beyond the actual motor housing and interrupting the cooling ribs 7 is arranged on the upper side of the motor and into which the stator winding connections are fed and via which the electrical connection of the motor is effected.

The motor housing 1 may be closed in the usual manner by way of a fan cowl, the electrical connection then being effected directly in the terminal box 8. With the embodiment represented in the drawings the motor is however provided with a frequency converter, a corresponding frequency converter housing 2 being connected to the motor housing 1.

The frequency converter housing 2 comprises a first housing part 9 which connects directly to and laterally overlaps the motor housing 1 and at the same time forms the fan cowl, as well as a second housing part 10 and a lid 11. The second housing part 10 is formed from a section of a corresponding profiled extrusion of a hollow aluminium profile and determines the length of the frequency converter housing 2. The first housing part 9 is formed as a metallic injection moulded part, the lid 11 is a plastic injection mould part.

The first housing part 9 comprises a tubular part 12 which overlaps the motor housing 1 and onto which the ribbed part 13 connects. The tubular part 12 comprises lateral bores 14 onto which the first housing part 9 is fixed to the motor housing 1 by way of screws. The ribbed part 13 of the first housing part 9 comprises outer cooling ribs 15, which are essentially flush to the cooling ribs 7 of the motor housing 1. Between the cooling ribs 15 in the region where the ribbed part 13 blends into the tubular part 12, openings are provided in the housing wall, so that the cooling air stream sucked from the fan wheel can flow along these cooling ribs 15 into the frequency converter housing 2.

Figure 2:
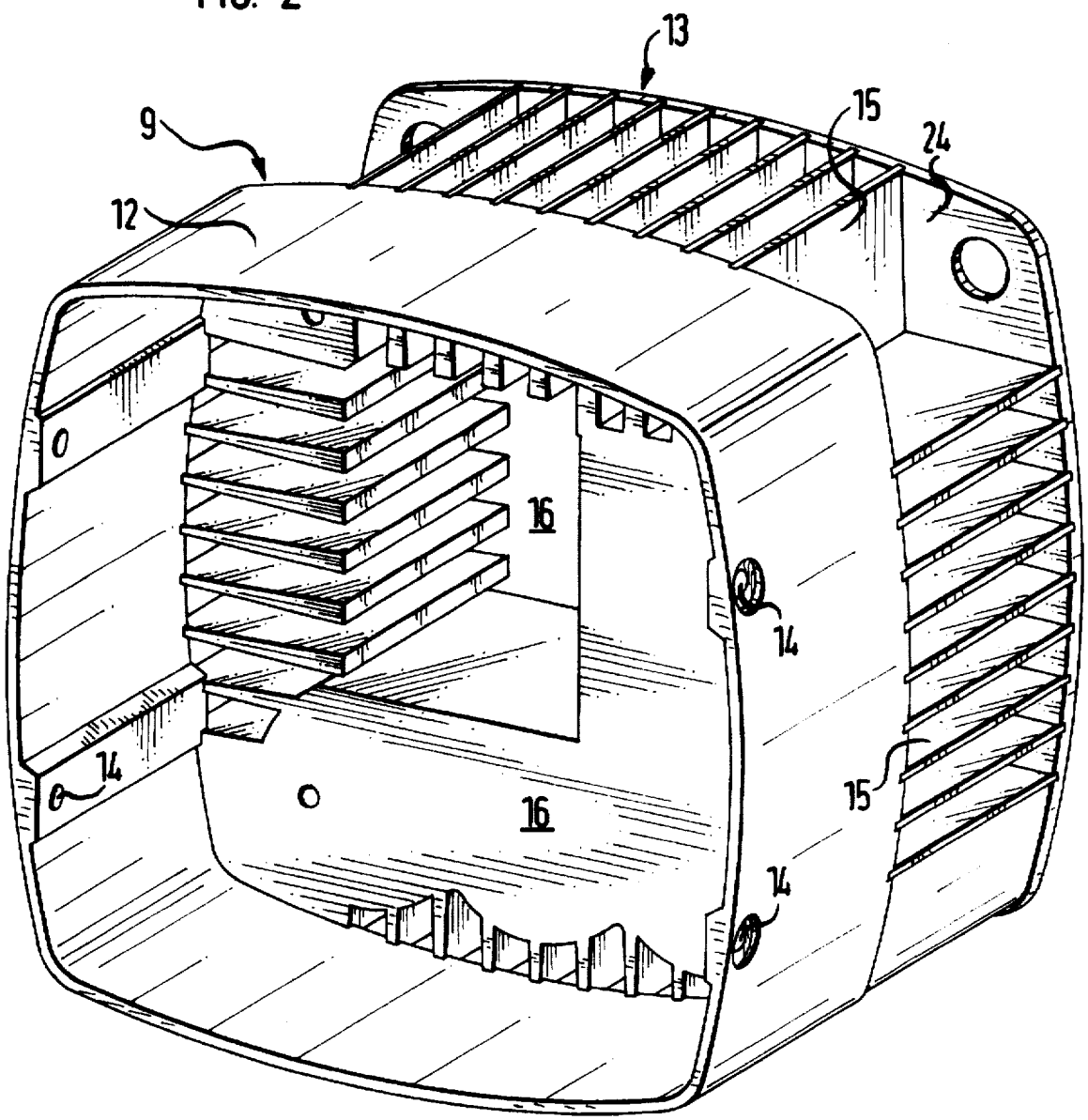

Within the first housing part 9 there is provided a transverse wall 16 which seals the frequency converter housing 2 from the fan space. This transverse wall 16 is formed in a stepped manner, as can be seen from FIG. 2. In this way even more cooling ribs may be provided within the first housing part 9, in particular the inner surface area of the frequency converter housing 2 is increased which leads to an even more intensive heat exchange with the cooling air stream and further makes possible any spacial adaptation to the components of the power circuit of the frequency converter, as can be seen deduced from FIG. 4. This step formed transverse wall 16, on the side facing the second housing part 10, is designed as a plane surface 17 for a heat conducting connection to the power electronics. The neighbouring region which drops away to the motor is formed to receive the capacitors 18 of the power circuit as well as a coil 19 of the frequency converter. The heat conducting connection to the plane surface 17 is effected a manner known per se via a heat spreader, which in its turn is connected in a heat conducting manner with the heat producing semi-conductor elements of the power circuit of the frequency converter.

Figure 3:
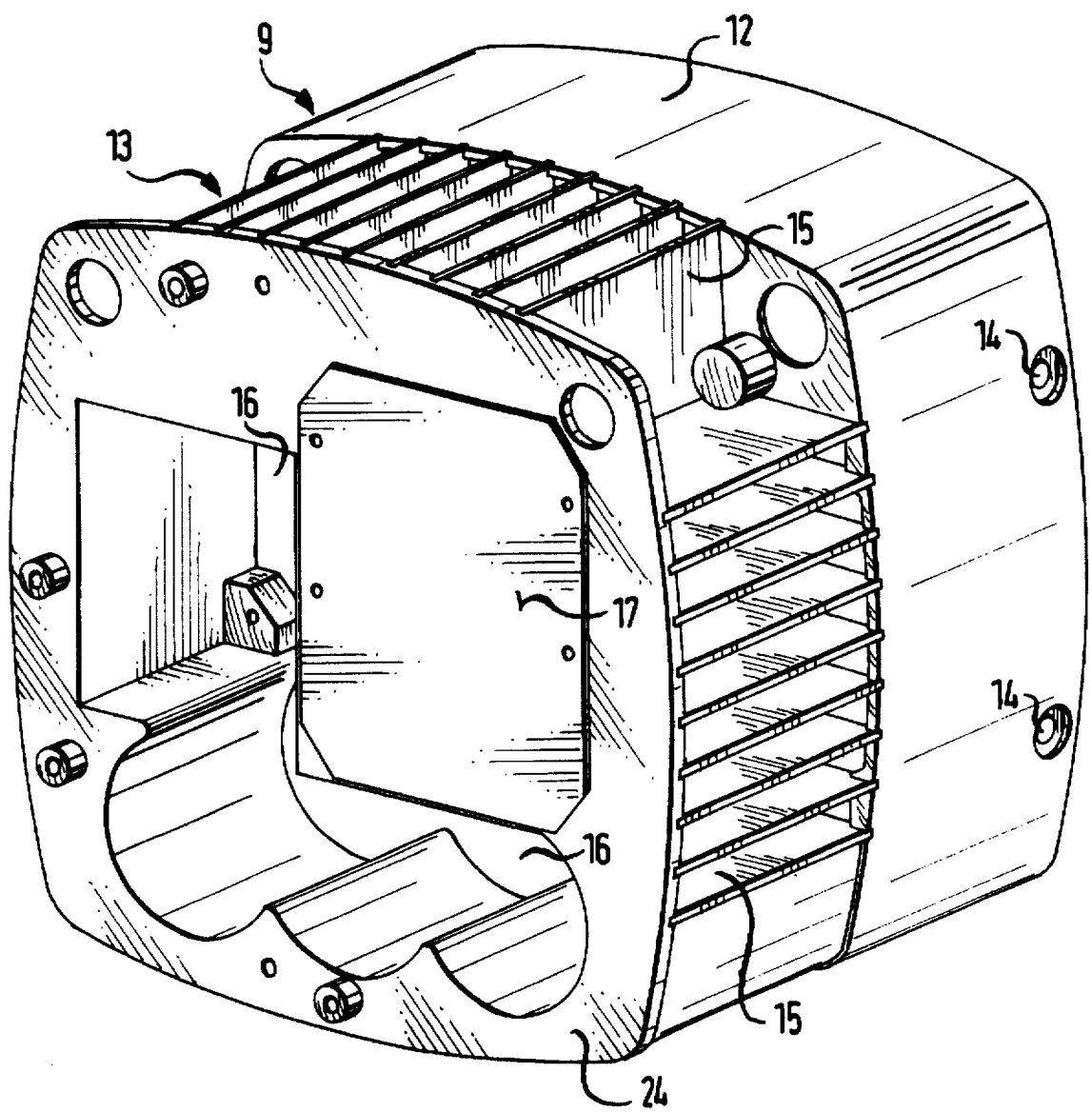

In FIG. 4 a circuit board 20 can be seen, which carries the important components of the power circuit. It can be clearly seen that the first housing part 9, particularly within the ribbed part 13, is provided and formed to receive those components protruding from the circuit board (see FIG.3).

On the other side of the circuit board 20 in the region of the second housing part 10 is connected an insulating plate 21 as well as a circuit board 22 which carries further electronic components of the frequency converter.

On connecting the frequency converter in series the connection of the motor is not effected directly via the terminal box, but via the frequency converter. The electrical conductor connection between the terminal box 8 and the frequency converter housing 2 is effected via a tube 23 which connects to the side of the terminal box 8 facing the frequency converter housing 2, passes through the tubular part 12 of the first housing part 9 and runs past the cooling ribs 15 and finally, in a flange 24, runs into the second housing part 10 at the end of the ribbed part 13 of the first housing part. The tube 23 is sealingly connected at its ends with the frequency converter housing 2 on the one side and the terminal box 8 on the other side, so that the terminal box 8 as well as the frequency converter housing 2 are hermetically sealed, at least however are formed protectively against water spray.

In the second housing part 10 are provided three bores, in which plastics lead bushings 25 are screwed. By way of these plastics lead bushings 25, the electrical connection leads are sealingly led out of the frequency converter housing 2.

The second housing part 10 which is formed as a section of tubing is fastened to the first housing part 9 via a flange thereof 24 and bores provided therein. Accordingly, the lid 11 is fastened to the other side by way of screws.

In a constructional range, motor housings of different lengths are provided, but which have the same cross-sectional connection measurements. Within certain limits the power of the motor can therefore be changed merely by changing the constructional length (with appropriate adaption of the inner construction). A corresponding power adaptation of the frequency converter is however necessary. With increasing motor power the size of the capacitors 18 particularly is increased and these are to be accomodated in the frequency converter housing. For this purpose the length adaptation is served by the second housing part 10 which is lengthened according to the required constructional length. In this manner, the frequency converter housing 2 may be varied in length without having to be designed in any other manner. It is sufficient therefore for a constructional range of motors having the same outer contour to adapt the frequency converter housing 2 with regard to the second housing part. Those injection moulded parts which are costly to produce, namely the first housing part 9 and also the lid, remain unaltered. Since the second housing part 10 is made from a profiled section of tubing, it may be cheaply made available in any length.

What is claimed is:

1. A frequency converter supplied electric motor comprising a motor housing and a cooling air blower for generating cooling air for cooling, said cooling air to be guided along cooling ribs which are arranged on the motor housing, characterized in that a frequency converter is arranged in a frequency converter housing which is detachably connected to said motor housing, said frequency converter housing further comprising a first heat conducting housing part and at least one further housing part, said first heat conducting housing part of said frequency converter housing defining fan cowl and comprising a transverse wall which is provided and formed for heat conducting connection at least one heat producing component of a power circuit of said frequency converter, wherein said first heat coducting housing part comprising a wall having a plurality of ribs and inlet openings for receiving said cooling air; and wherein said at least one further housing part is connected to said first heat conducting housing part.

2. An electric motor as recited in claim 1 wherein said at least one further housing part of said frequency converter housing is formed by a tubular hollow profile, said tubular hollow profile comprising a free end closed by a lid at its free end.

3. An electric motor as recited in claim 1 wherein said first heat conducting housing part and said at least one further housing part are formed from one piece.

4. An electric motor as recited in claim 1 wherein frequency converter housing is sealingly protected against water spray.

5. An electric motor as recited in claim 1 wherein said first heat conducting housing part is a metallic cast part and that at least one further housing part which connects thereto is a section of metal tubing.

6. An electric motor as recited in claim 1, wherein said motor housing is provided with a terminal box arranged on the outside of said motor housing and connected to said frequency converter housing via at least one externally lying tube through which electrical leads are guided.

7. An electric motor as recited in claim 2, wherein said end side lid of said frequency converter housing is an injection molded plastics part.

8. An electric motor as recited in claim 1, wherein said first heat conducting housing part of said frequency converter, in the region of said transverse wall, is adapted to the topography of the power electronics of said frequency converter and to the outer contour of the fan wheel of said blower.

9. An electric motor as recited in claim 1, wherein said frequency converter housing aligns with said motor housing and runs essentially into the cross-sectional outer contour thereof.

* * * * *